(12) United States Patent
Linn et al.

(10) Patent No.: US 10,464,492 B1
(45) Date of Patent: Nov. 5, 2019

(54) TONNEAU WITH CARGO MANAGEMENT BASKET

(71) Applicant: Reliable Engineered Products, LLC, Charlotte, MI (US)

(72) Inventors: Randy W. Linn, Charlotte, MI (US); Joseph T. Kolwick, Grand Ledge, MI (US); Thomas P. Nowicki, Okemos, MI (US)

(73) Assignee: Reliable Engineered Products, LLC, Charlotte, MI (US)

( * ) Notice: Subject to any disclaimer, the term of this patent is extended or adjusted under 35 U.S.C. 154(b) by 0 days.

(21) Appl. No.: 16/252,051

(22) Filed: Jan. 18, 2019

Related U.S. Application Data

(60) Provisional application No. 62/661,317, filed on Apr. 23, 2018.

(51) Int. Cl.
*B60R 5/04* (2006.01)
*B60J 7/10* (2006.01)

(52) U.S. Cl.
CPC .............. *B60R 5/045* (2013.01); *B60J 7/102* (2013.01); *B60R 5/041* (2013.01)

(58) Field of Classification Search
CPC ........... B60R 5/045; B60R 5/041; B60J 7/102
USPC ........................................................ 296/37.6
See application file for complete search history.

(56) References Cited

U.S. PATENT DOCUMENTS

| | | | | |
|---|---|---|---|---|
| 4,733,898 A | * | 3/1988 | Williams | B62D 33/02 224/404 |
| 4,844,305 A | * | 7/1989 | McKneely | B60R 11/06 224/404 |
| 5,964,492 A | * | 10/1999 | Lyon | B60R 9/00 224/404 |
| 6,318,781 B1 | * | 11/2001 | McKee | B60R 9/00 296/26.09 |
| 8,256,820 B2 | * | 9/2012 | Spencer | B60R 11/06 296/37.6 |
| 2008/0185862 A1 | * | 8/2008 | Tarrant | B60R 9/00 296/37.6 |
| 2009/0250362 A1 | * | 10/2009 | Melmon | A45C 11/38 206/316.2 |
| 2016/0107515 A1 | * | 4/2016 | Shi | B60J 7/062 296/100.18 |

* cited by examiner

*Primary Examiner* — Joseph D. Pape
(74) *Attorney, Agent, or Firm* — Frank M. Scutch, III

(57) ABSTRACT

A tonneau for use with a pick-up truck bed includes a frame for attachment over the truck bed and a cover configured on top of the frame to protect the contents of the bed. The tonneau further includes a slidable cargo basket configured at the rear of the pick-up truck bed for enabling easy cargo access. The cargo management basket includes a plurality of slidable panels that are foldable allowing users to easily access the truck bed.

20 Claims, 20 Drawing Sheets

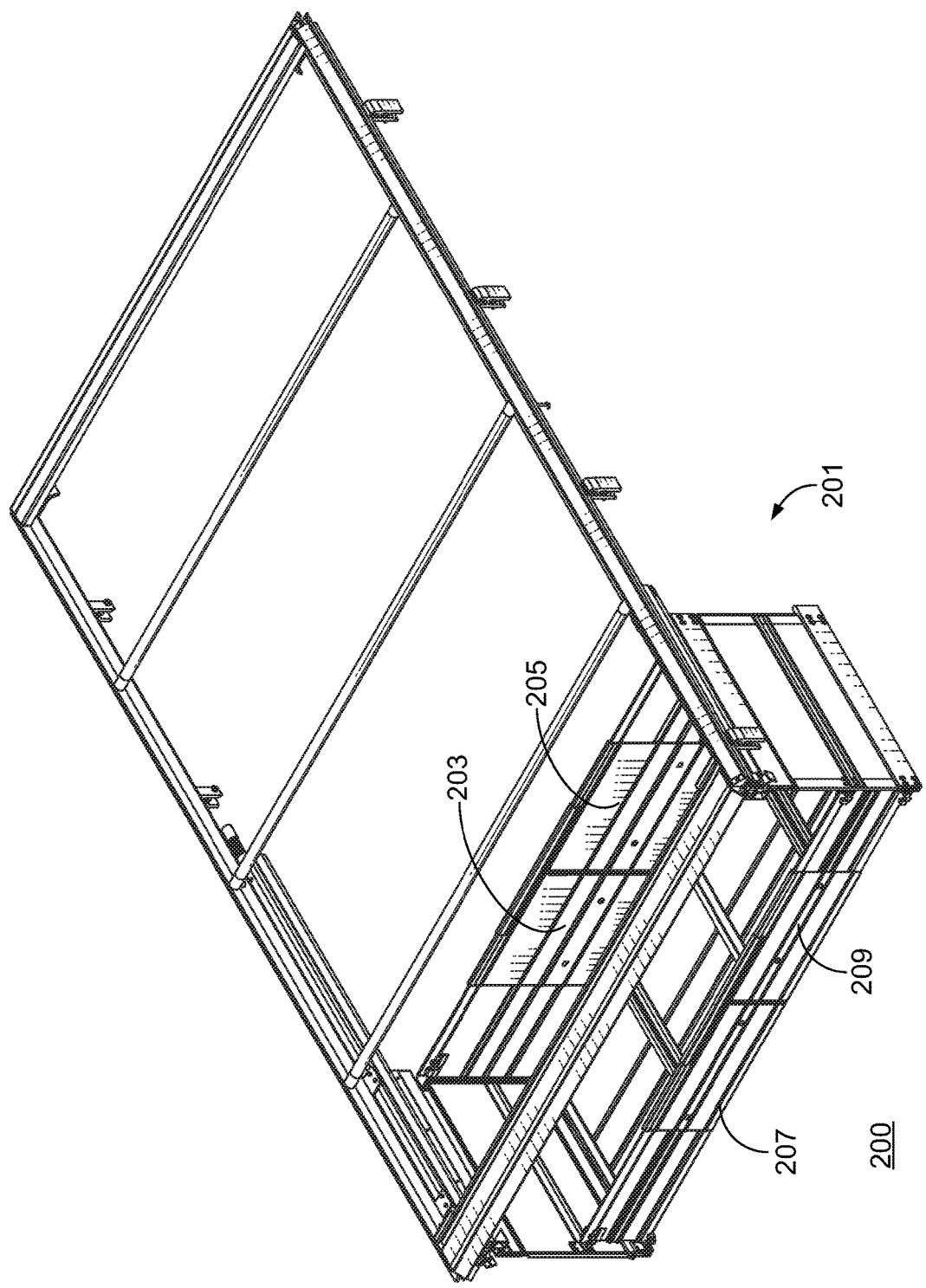

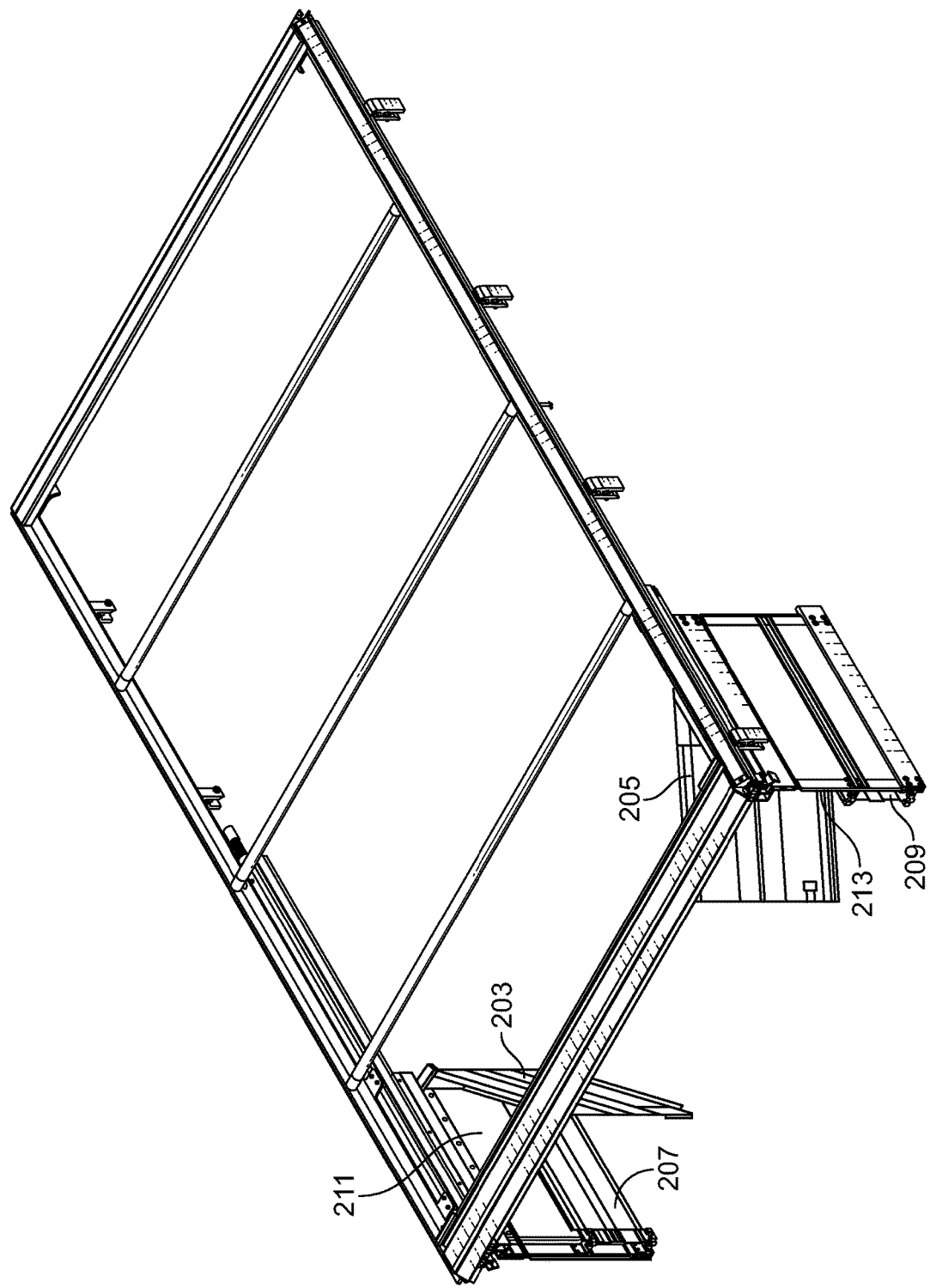

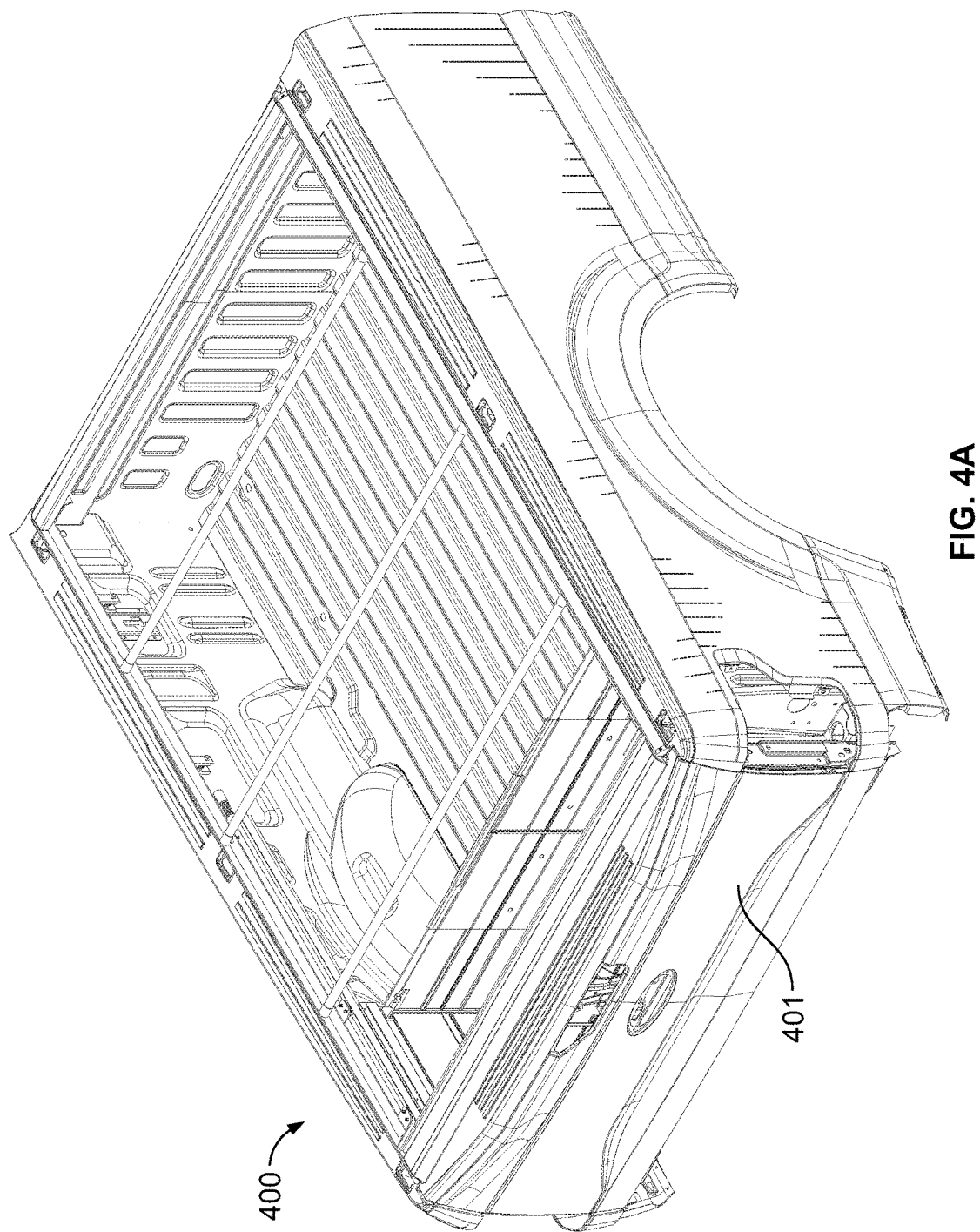

TONNEAU WITH CARGO MANAGEMENT BASKET

CROSS-REFERENCE TO RELATED APPLICATIONS

This application is related to U.S. Design patent application Ser. No. 29/677,345 entitled "A TONNEAU WITH CARGO MANAGEMENT BASKET" filed Jan. 18, 2019 and owned by Reliable Engineered Products, LLC.

FIELD OF THE INVENTION

The present invention relates generally to truck pick-up accessories and more particularly to a tonneau having a cargo management basket.

BACKGROUND

A tonneau cover or "tonneau" is well known in automotive terminology and generally refers to a cargo space area of a car or truck that opens from the top. In a pickup truck or utility vehicle having an open bed, the tonneau often describes a hard or soft cover used to protect the cargo bed from the environment. Hard tonneau covers open by a hinged or folding mechanism while soft covers typically open by rolling up the soft vinyl material. Both types of covers work to conceal and/or cover the bed and/or cargo. The tonneau also keeps items in the truck bed out of the driving environment by providing extra security to keep personal items out of sight.

One of the problems associated in using a tonneau, in connection with the truck bed, deals with the truck while in motion. When an item is located in the bed for transport, it can move freely around the bed under the tonneau with the motion of the vehicle. In the case of groceries or other fragile items, this can have disastrous consequences even under the best driving conditions since the truck and cargo can be damaged by items rolling round in the bed.

Accordingly, a tonneau with additional features for securing items is needed for use with an open bed pick-up truck.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2A is a perspective view of the tonneau assembly where the floor pan in the cargo management basket is fully deployed in the forward position.

FIG. 2C is perspective view of the tonneau assembly where the floor pans are fully stowed, the short gate assemblies are fully stowed, and the tall gate assemblies are pivoting into their stowed positions.

FIG. 4A is a perspective view of the cargo management basket in a deployed forward position with the truck bed tailgate closed.

DETAILED DESCRIPTION

Figure 1:
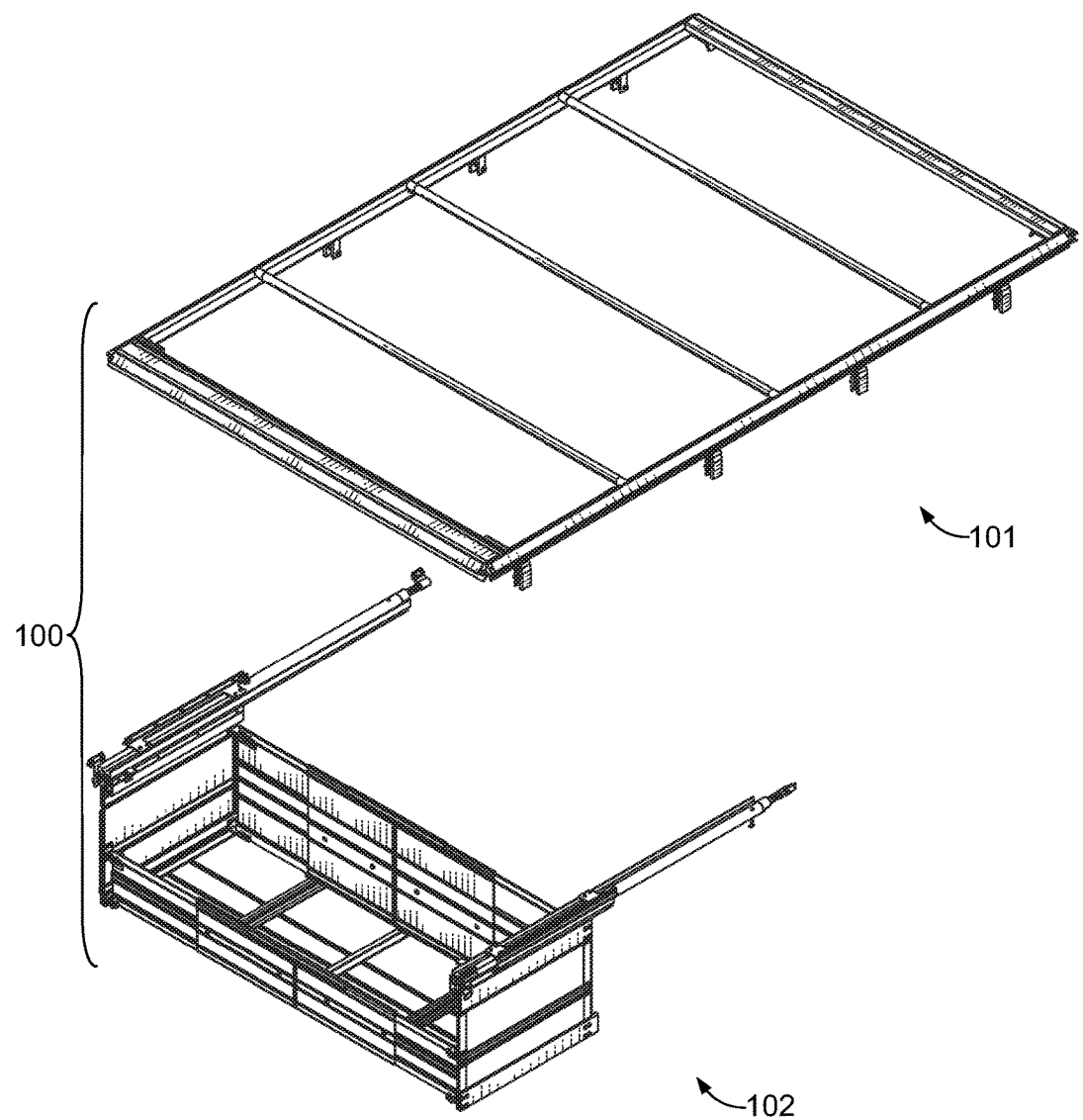
FIG. 1 is an exploded view illustrating the tonneau cover frame subassembly and cargo management subassembly according to an embodiment of the invention.

Before describing in detail embodiments that are in accordance with the present invention, it should be observed that the embodiments reside primarily in combinations of apparatus components related to a tonneau pick-up bed cover. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

FIG. 1 is an exploded view of a tonneau and its cover according to an embodiment of the invention. The tonneau assembly 100 includes a cover frame subassembly 101 and a cargo management basket subassembly 102. The cover frame subassembly 101 works in combination with the cargo management basket subassembly 102 for providing a cover over the truck bed by providing the user with additional utility of providing a slidable cargo management basket which provides the user with easy access to cargo items.

Figure 1A:
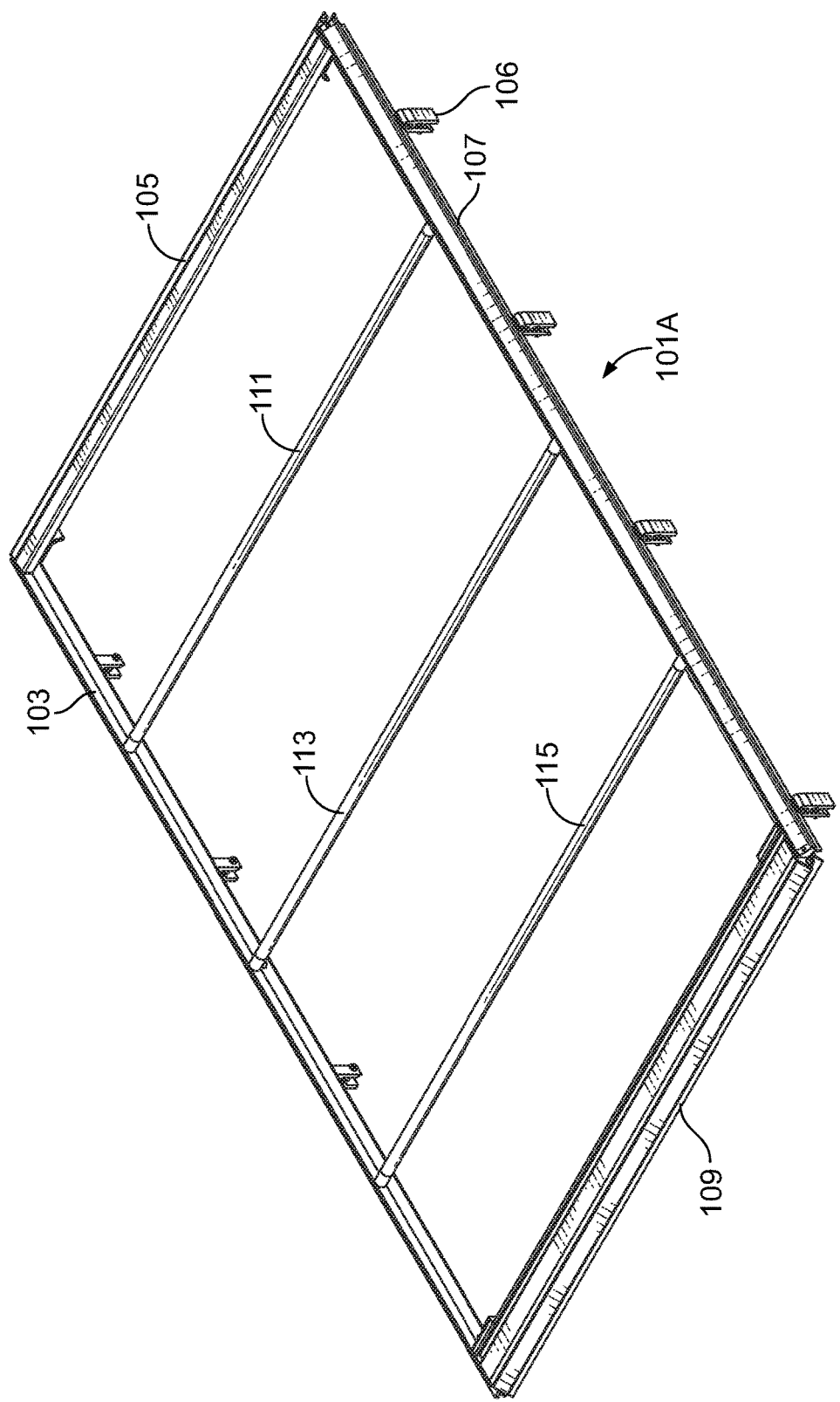
FIG. 1A is an upper perspective view of the tonneau cover frame subassembly.

FIG. 1A is an upper perspective view of the tonneau cover frame subassembly. The tonneau cover frame subassembly 101A is comprised of a driver side rail 103, a front header 105, a passenger side rail 107, a rear header 109, and a plurality of side rail clamps 106. The frame 101A is substantially rectangular in shape where both frame 101 and the cargo management basket subassembly 102 are manufactured of plastic or metal material allowing it to remain rigid while covering the pick-up truck bed. The frame rails 103 and 107 are angled so they can be positioned at a point on the top edge of the truck bed and the inner edge of the truck bed. Each respective rail 103, 107 attaches to the upper rim of the truck bed using a side rail clamp 106 that frictionally engages under the rim of the truck bed to hold the cover frame subassembly 101A into a fixed position. In one embodiment, four (4) clamps can be positioned under both the driver side rail 103 and passenger side rail 107 for use with up to 7 foot and 8-foot sized pick-up long beds. Further, the frame 101A includes a plurality of cross-bar supports 111, 113, 115 that work to provide cross-support for the tonneau cover on the frame subassembly. The tonneau cover used to cover the frame subassembly 101A is typically a strong material such as cloth, vinyl or metal to protect any cargo from theft and/or environmental elements when placed within the truck bed.

Figure 1B:
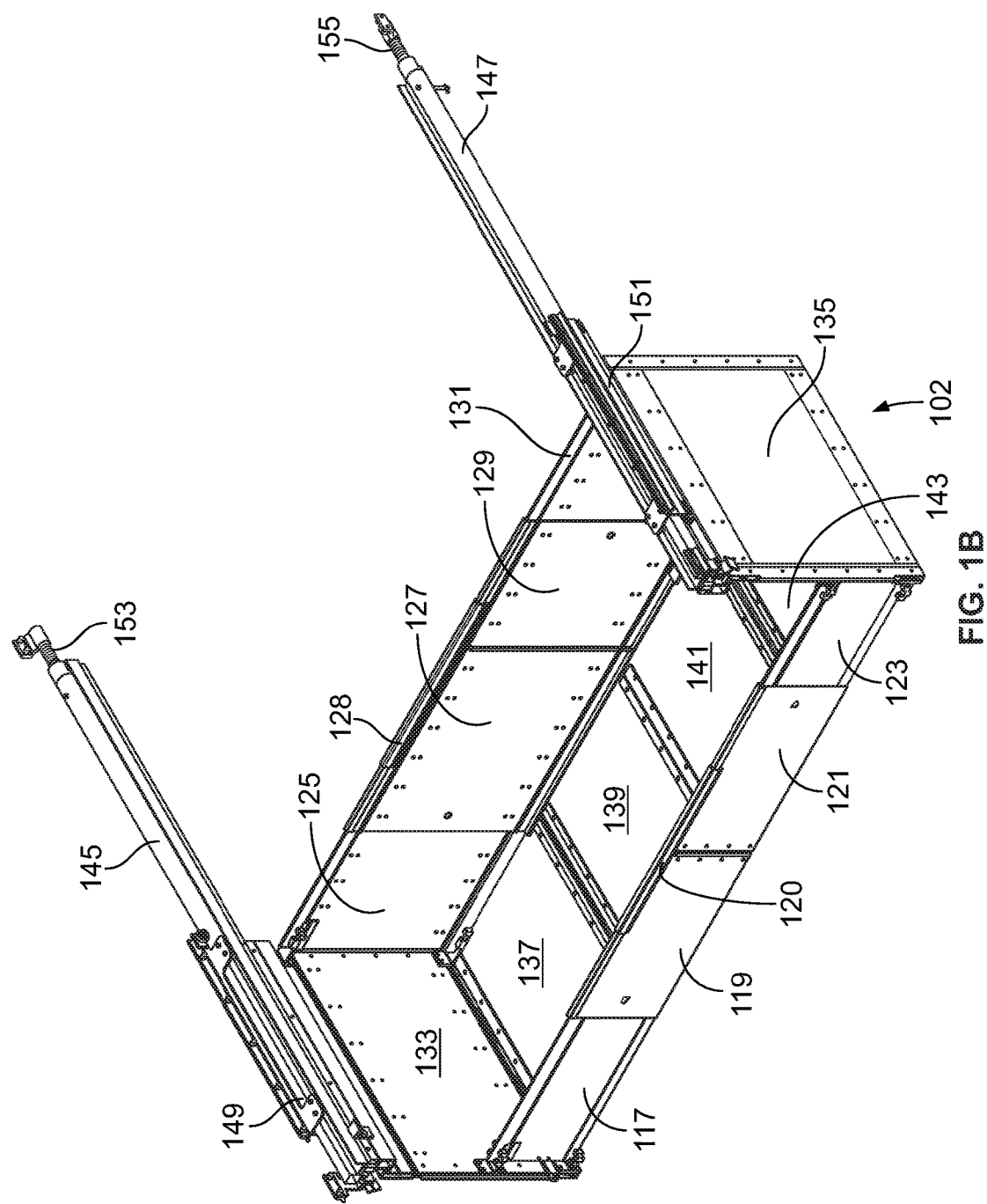
FIG. 1B is an upper perspective view of the cargo management subassembly.
Figure 1C:
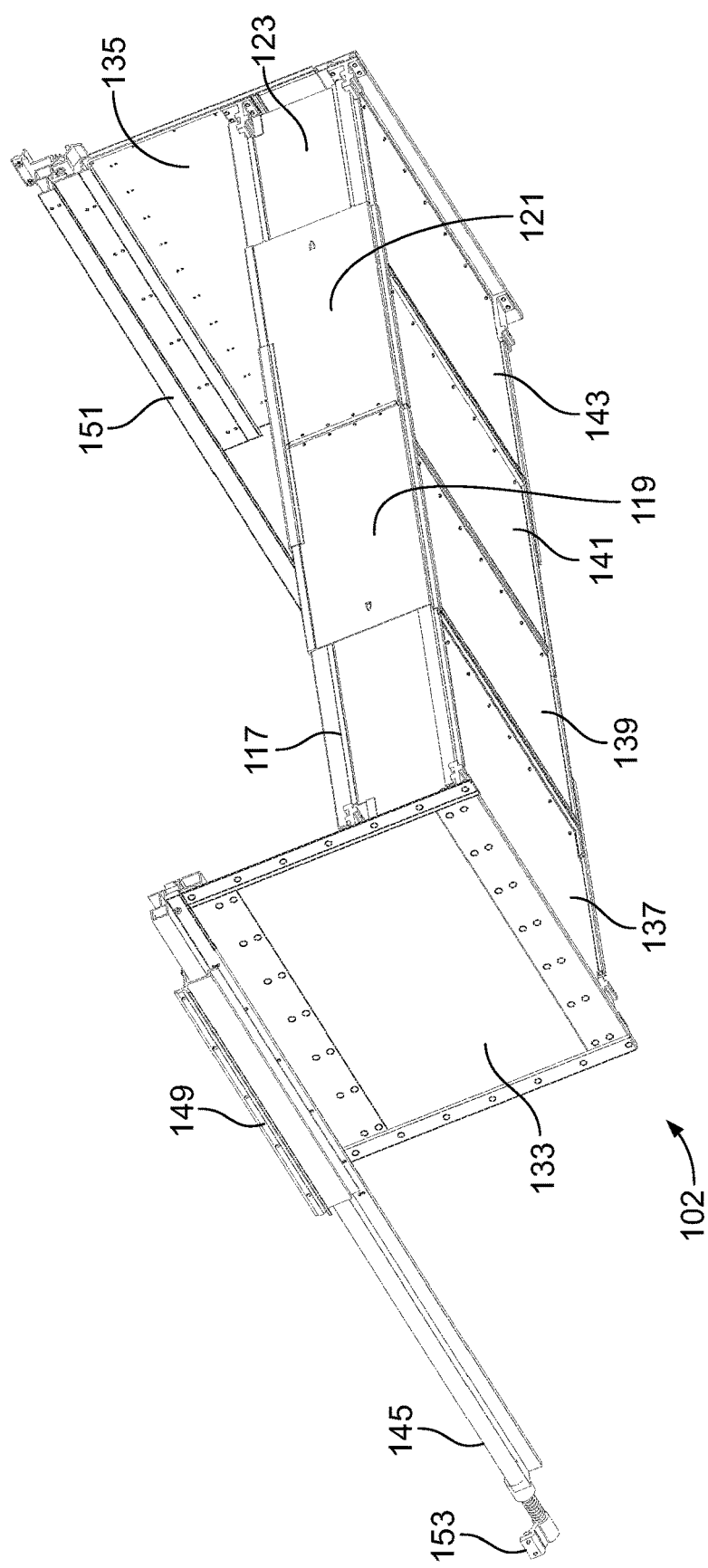
FIG. 1C is a lower perspective view of the cargo management subassembly.

FIG. 1B is an upper perspective view of the cargo management basket subassembly. FIG. 1C is a lower perspective view of the cargo management basket subassembly. With regard to both FIG. 1B and FIG. 1C, the cargo management basket subassembly 102 is substantially rectangular forming a drawer-like shape and is formed using a plurality of panels supported by a frame. More specifically, the front of the basket is formed by a driver side short pivot gate 117, a driver side short slide gate 119, a passenger side short sliding gate 121 and a passenger side short pivot gate 123. The driver side short slide gate 119 and the passenger short sliding gate 121 are joined or latched together at their upper or top edge using a short gate slide lock 120 that bridges the gates 121, 123 holding them in position.

Similarly, the rear of the basket if formed by a driver side tall pivot gate 125, driver side tall sliding gate 127, passenger side tall sliding gate 129 and passenger side tall pivot gate 131. The driver side tall sliding gage 127 and passenger side tall sliding gate 129 are also joined or latched together at their upper edge using a tall gate slide lock 128. The sides of the basket are formed by driver side panel 133 and passenger side panel 135. The bottom of the basket is formed using a plurality of folding panels. These include first driver side floor pan 137, and second driver side floor pan 139, first passenger side floor pan 141 and second passenger side floor pan 143. Although the cargo management basket 102 typically uses a solid floor pan, those skilled in the art will also recognize the bottom of the cargo management basket can also include or be replaced with a net or mesh-like material to securely hold items in the basket.

The cargo management basket subassembly 102 is supported by and is suspended from a driver roller rail 145 and a passenger roller rail 147. A driver roller plate 149 and passenger roller plate 151 work with the respective roller rail 145, 147 allowing the roller plate to move and/or glide along the rail. This enables the cargo management basket 102 to move between a fully extended and fully forward position. The driver roller plate 149 and passenger roller plate 151 both include a slider mechanism, roller bearing or the like allowing a smooth and easy motion along each of the roller rails 145, 147. Each of the driver roller rail 145 and passenger side rail 147 is adjusted in the truck bed using a respective tensioner 153, 155 located at the end of each rail. The tensioner 153, 155 provides a back stop which applies tension on the roller rails for ease of operation as well as unclamping and moving the basket to the extended position.

In order that the user may gain easy access to the truck bed, each of the gates in the basket slide to open. More specifically, the short gate slide lock 120 is moved to allow the driver side sliding gate 119 and passenger side sliding gate 121 to be moved outwardly to slide open thus creating a gap of hole. Similarly, the tall gate slide lock 128 also moves to allow the driver side tall slide gate 127 and passenger side tall slide gate 129 slide outwardly to create and opening or access slot into the truck bed. Moreover, as described herein, the cargo management basket subassembly 102 can be folded to allow full access to the truck bed.

The folding process for storage of the cargo basket includes the following steps.
1. Unlatch and slide the cargo management basket 102 to its extended position.
2. Fold the first driver floor pan 137 to driver side panel 133.
3. Fold first passenger floor pan 141 to passenger side pane 135.
4. Disengage the short gate slide lock 120.
5. Slide the driver side short sliding gate 119 over the driver side short pivot gate 117.
6. Lift and rotate the driver side short pivot gate 117 into its stowed position next to the second driver side floor pan 139 in its folded position.
7. Slide the passenger side short sliding gate 121 over the passenger side short pivot gate 123.
8. Lift and rotate the passenger side short pivot gate 123 into its stowed position next to the second passengers side floor pan 141 in its folded position.
9. Disengage tall gate slide lock 128.
10. Slide the driver side tall sliding gate 127 over the driver side tall pivot gate 125.
11. Lift and rotate the driver side tall pivot gate 125 into its stowed position over to the driver side panel 133 holding the driver folded assembly.
12. Slide passenger side tall sliding gate 129 over the passenger side tall pivot gate 131.
13. Lift and rotate the passenger side tall pivot gate 131 into its stowed position over to the passenger side panel 135 holding the folded passenger assembly.
14. Return the driver and passenger folded stowed basket assembly to its forward position in the truck bed.

FIG. 2A is a perspective view of the tonneau assembly where the floor pan in the cargo management basket is deployed and the basket in its forward position. The tonneau assembly 200 is illustrated where the cargo management basket 201 is shown in a forward position normally used in transit. The driver side tall slide gate 203 and passenger side tall slide gate 205 are shown pulled together or closed and the driver side short slide gate 207 and passenger side short sliding gate 209 is also shown pulled together or closed.

Figure 2B:
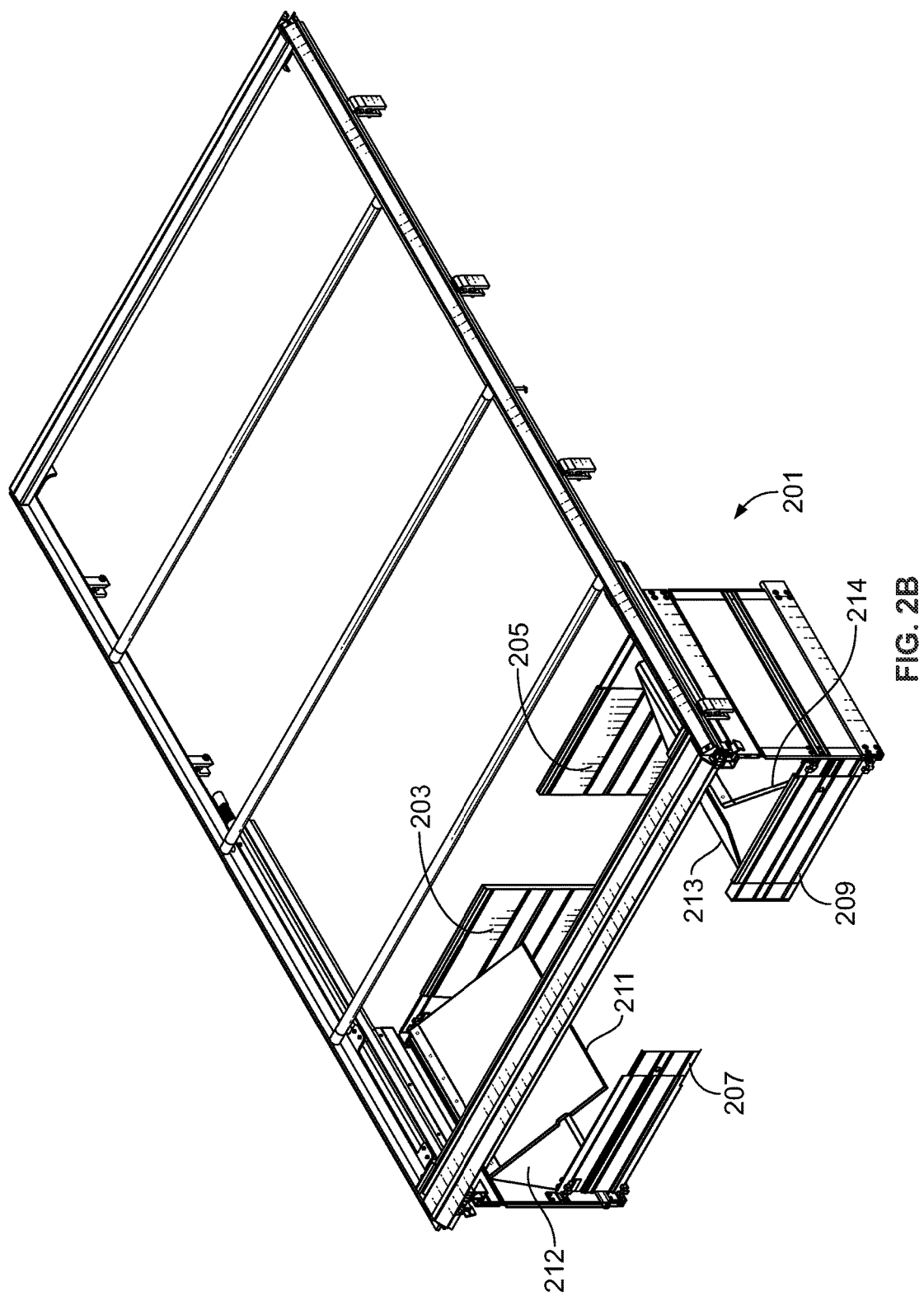
FIG. 2B is a perspective view of the tonneau assembly functionality where the floor pan in the cargo basket is partially folded and the sliding gates are open.

FIG. 2B is a perspective view of the tonneau assembly illustrating the steps in the folding process for the cargo management basket. Initially, the floor pan in the cargo management basket is folded. The second driver side floor pan 211 and folds upon the first driver side floor plan 212. Similarly, the second passenger side floor pan 213 folds upon the first passenger floor plan 214. The floor pan has concave or "cupped" shape on the edges allowing it to engage in the gate assemblies to maintain its flat surface during normal use. The floor plan includes a plurality of hinges allowing it to fold into quarter sections so to be easily stored against the side of the truck bed. Thereafter, when the user desires to fold up the cargo management basket 201, the driver side short sliding gate 207 and the and passenger side short sliding gate 209 each outwardly slide toward their respective side of the bed to form a gap. Similarly, the driver side tall sliding gate 203 and passenger side tall sliding gate 205 also slide outwardly toward the side of the truck bed to form a gap.

FIG. 2C is perspective view of the tonneau assembly where the floor plan is folded and the driver side tall gate assembly 203 is folding upon the driver side short gate assembly 207. Similarly, the passenger side tall gate assembly 205 is folded upon the passenger side short gate assembly 209. As described herein, the floor pans 211, 213 are pivoted upwardly and folded against the side panels of the basket which are next to the side of the truck bed. The driver side short gate assembly 207 and passenger side short gate assembly 209 are folded upon the previously stowed floor pans. Then the drivers tall sliding gate assembly 203 and passenger side tall gate assembly 205 are then folded upon the short gate assemblies so the truck bed is fully accessible.

Figure 2D:
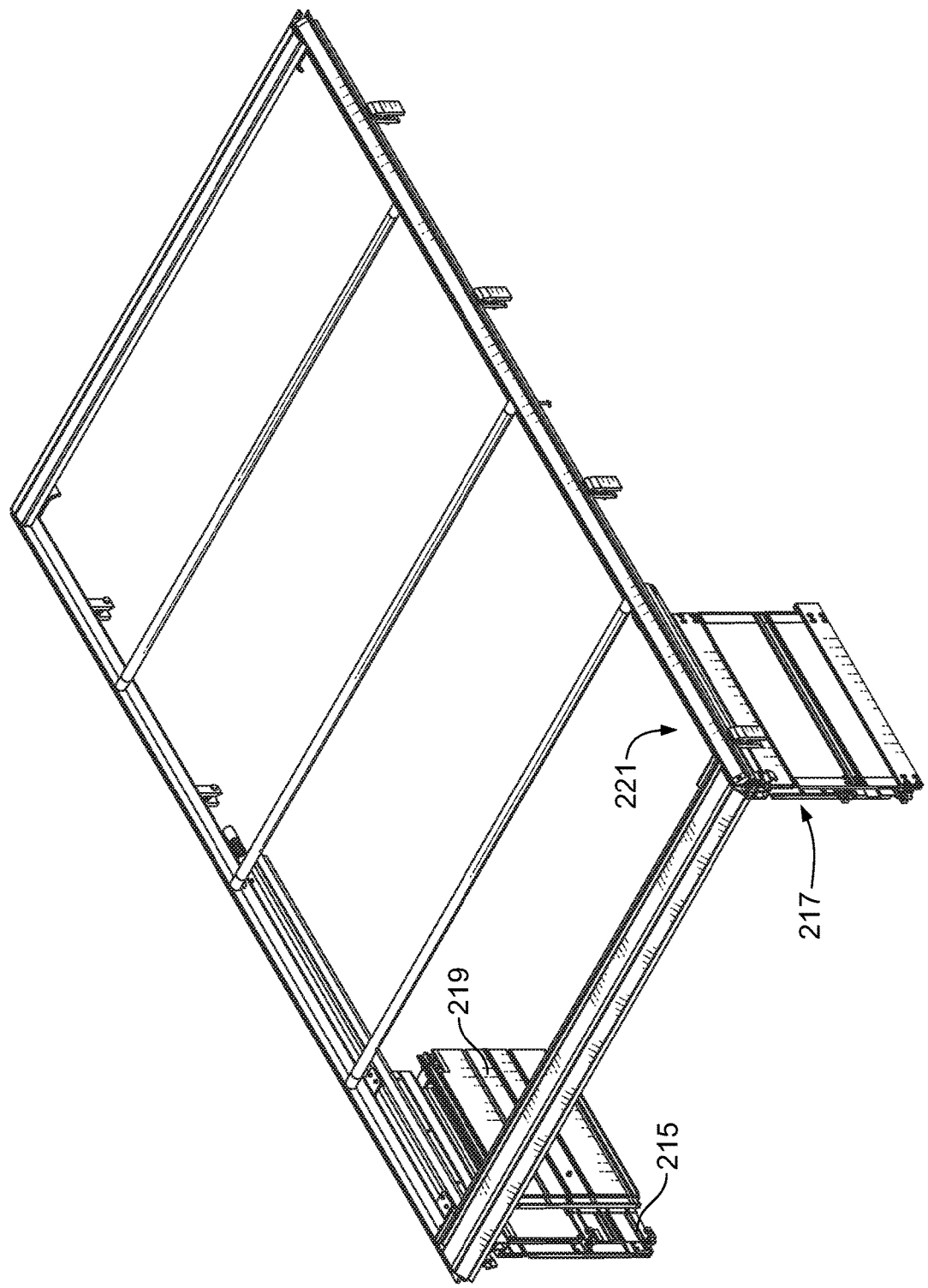
FIG. 2D is a perspective view of the tonneau assembly where the floor pans, tall gate assemblies, and short gate assemblies are illustrated in their fully stowed positions.

FIG. 2D is a perspective view of the tonneau assembly where the floor pans, driver and passenger tall gate assemblies as well as the driver's and passenger side short gate assemblies are illustrated in a fully folded and stowed position against their respective side panel. The folded driver side tall gate assembly 219 and folded passenger side tall gate assembly 221 are shown folded against the folded driver side short gate assembly 215 and folded passenger side short gate assembly 217 so to be in a stowed position against each respective side of the side panel. This enables the user to break-down and fold the cargo management basket so that it is folded and stowed out of the way if the entire truck bed area is needed under the tonneau cover.

Figure 3:
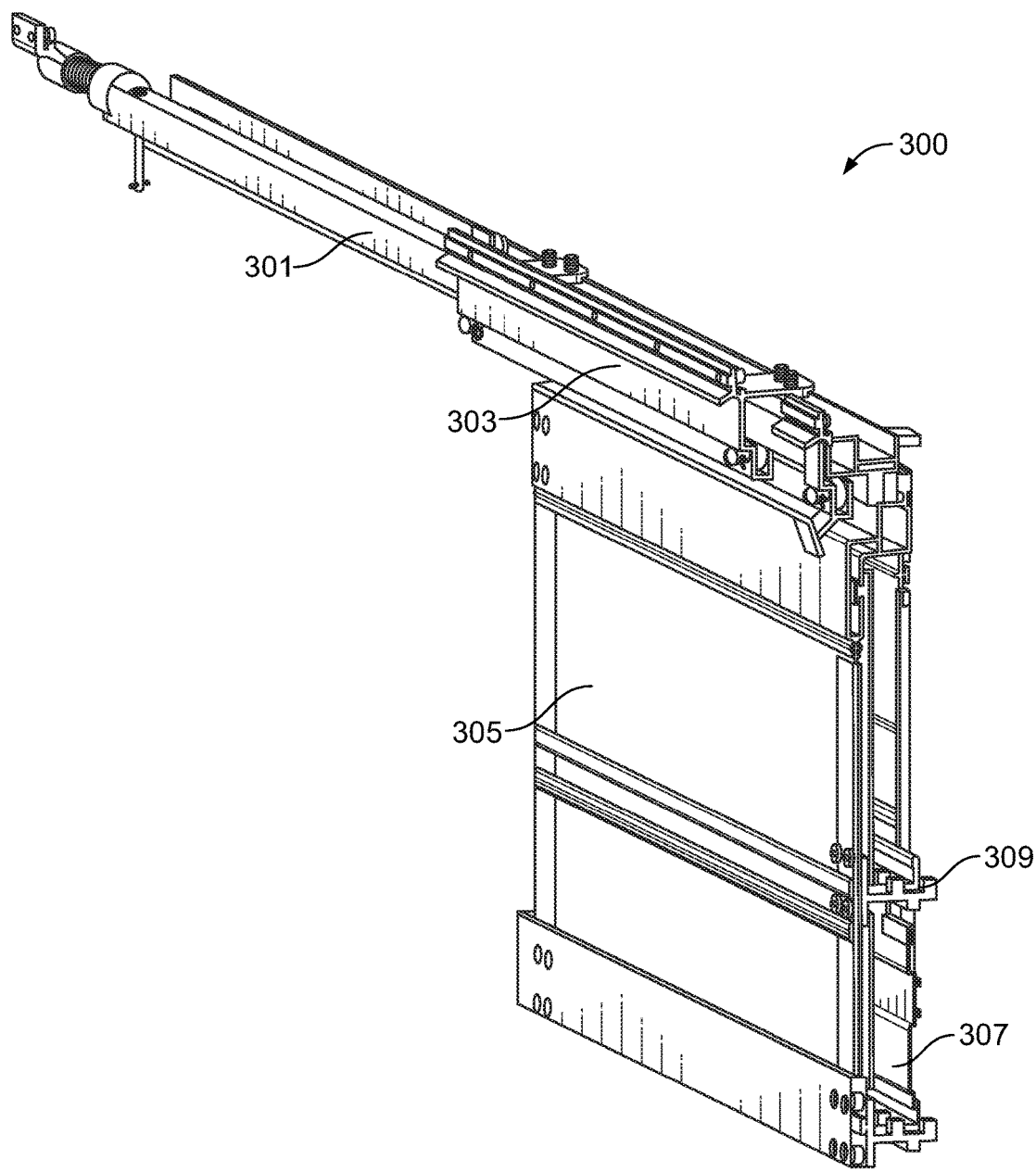
FIG. 3 is a magnified view of the passenger tall and short gate assemblies folded into the stowed position as shown in FIG. 2D.

FIG. 3 is a magnified view of the folded basket assembly with the passenger side tall gate assembly folded on the passenger side short gate assembly as show in FIG. 2D. The folded basket assembly 300 is illustrated with the passenger roller plate 303 that includes a slidable rail 301 that is attached to the roller plate 303 in a manner so that it can slide longitudinally partially along its length. The slideable rail 301 rides within a slot or channel using roller bearings or the like making it easy to move along the length to its extended position over the tailgate of the truck bed. As seen in FIG. 3, the passenger side tall gate assembly 305 is folded upon the passenger side short gate assembly 307 using one or more hinges 309 or the like.

FIG. 4A is a perspective view of the cargo management basket in a deployed forward position with the truck bed tailgate closed. The cargo management basket 400 is shown in its deployed forward position where the truck bed tailgate 401 is shown "raised" or closed. This is the typical position of the cargo management basket when in use and the vehicle is moving or in transit.

Figure 4B:
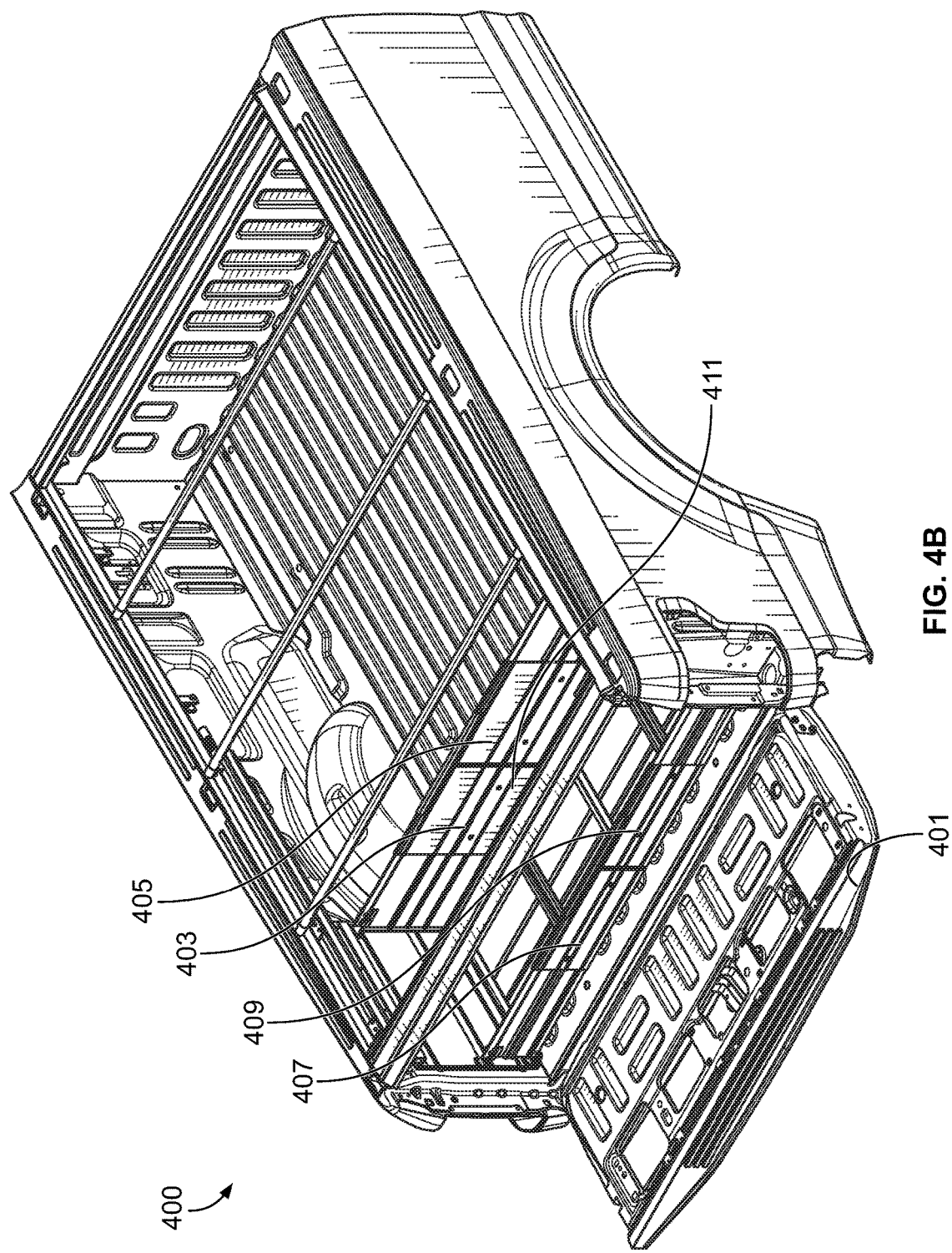
FIG. 4B is a perspective view of the cargo management basket in a deployed forward position with the truck bed tailgate open.

FIG. 4B is a perspective view showing the tonneau with its cargo management basket in a deployed forward position and the truck tailgate open. In this embodiment, the cargo management basket 400 is illustrated with truck tailgate 401 down where both the driver side tall sliding gate 403, passenger side tall sliding gate 405, driver side short sliding gate 407 and passenger side short sliding gate 409 are illustrated in a closed position so that items stowed with the cargo management basket 411 are contained inside the basket.

Figure 4C:
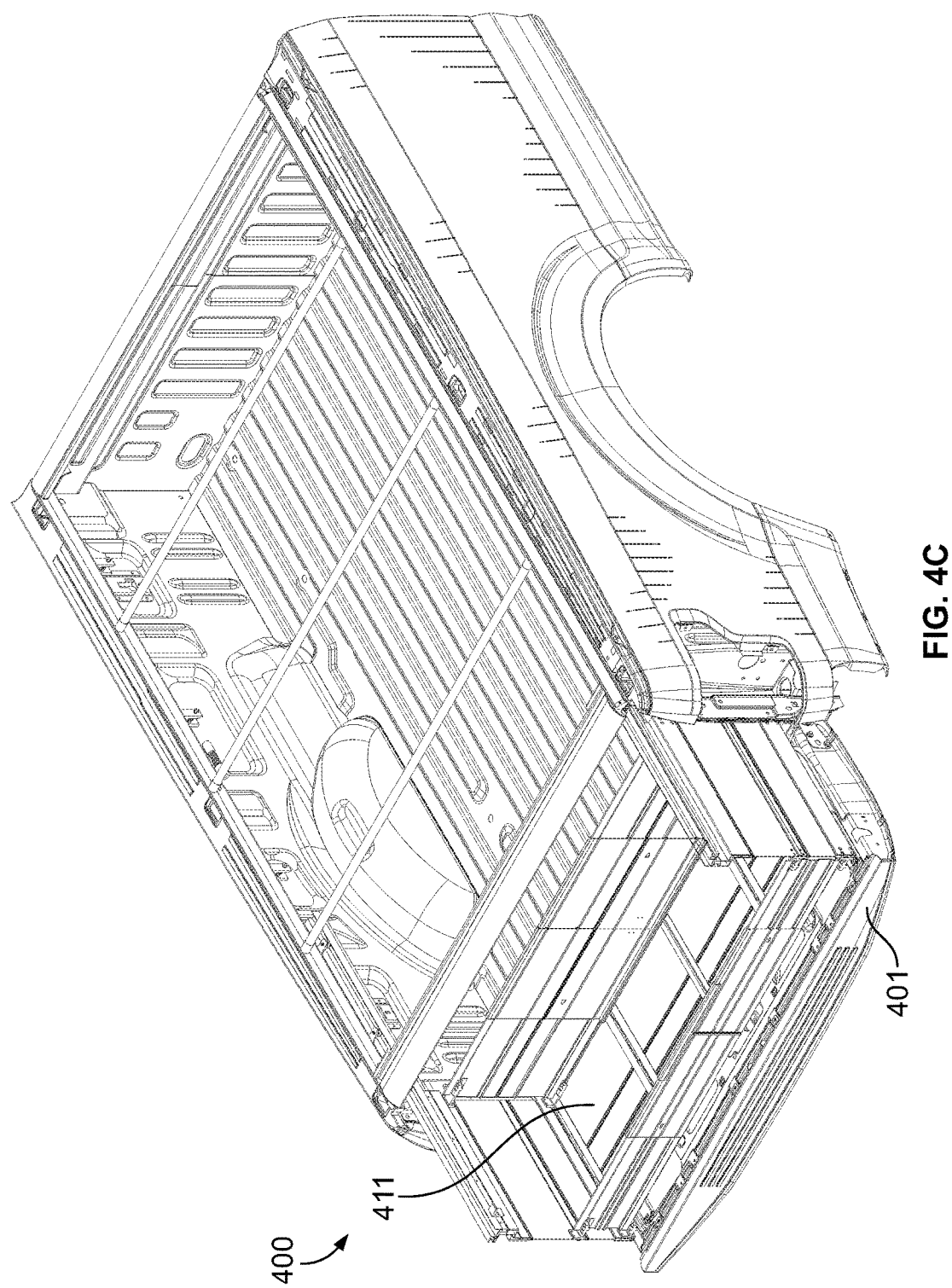
FIG. 4C is a perspective view of the cargo management basket in a deployed extended position with the truck bed tailgate down.

FIG. 4C is a perspective view of the cargo management basket in a deployed extended position with the truck bed tailgate down. In this view, the truck tailgate 401 is down or lowered and the cargo management basket assembly 400 is pulled outwardly so that it hangs over the tailgate 401. As noted herein, the cargo management basket 411 is suspended above the tailgate 401 so that it does not touch the surface of the of truck bed or tailgate. This is the typical position of the cargo management basket when the cargo is being loaded and unloaded in the basket.

Figure 4D:
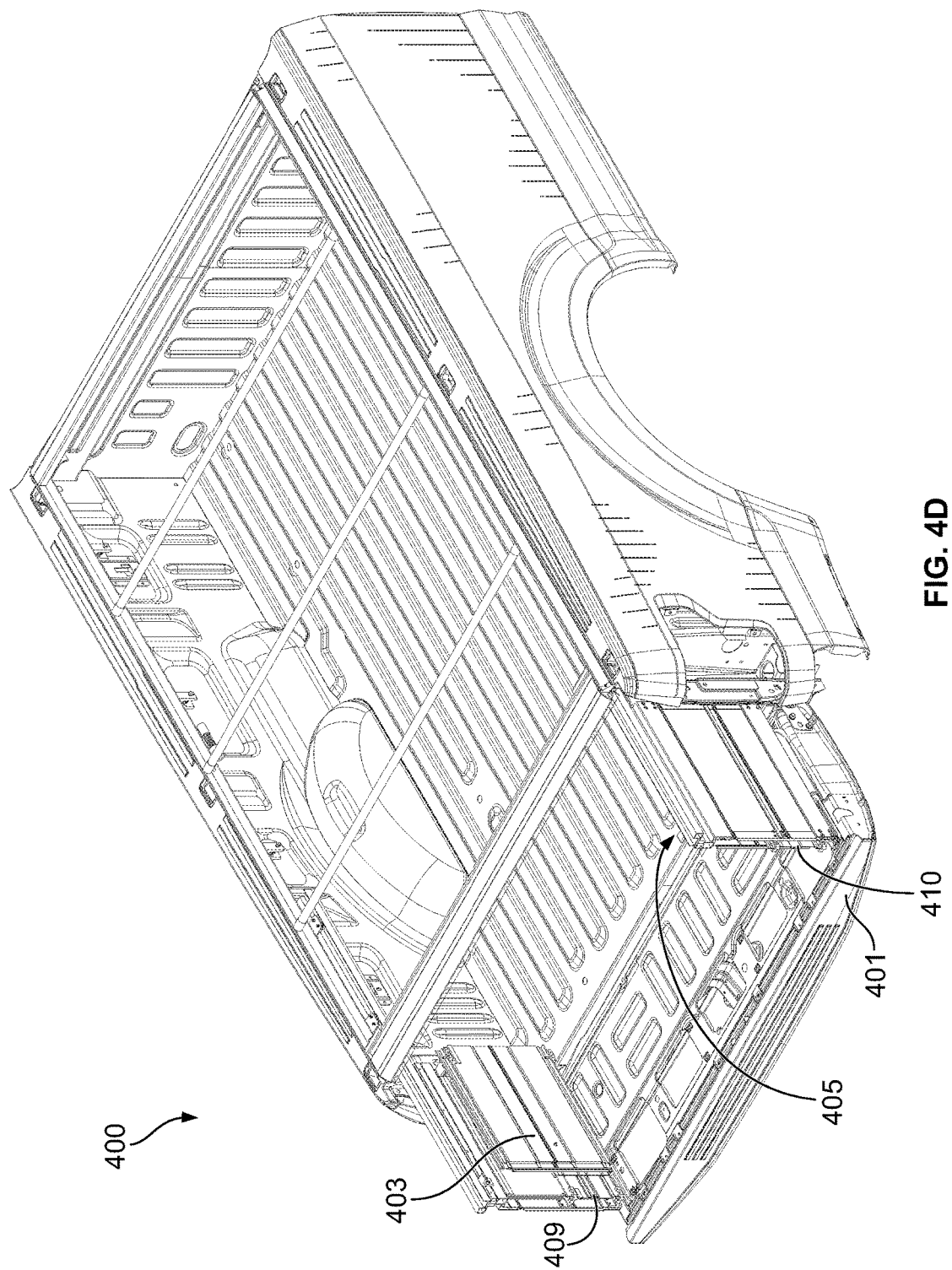
FIG. 4D is a perspective view of the cargo management basket illustrated in the stowed extended position over the truck bed tailgate.

FIG. 4D is a perspective view of the cargo management basket illustrated stowed and extended over the truck bed tailgate. As described herein, when the user desires to fold the cargo management basket to gain full access to the truck bed, the driver's and passenger tall sliding gates and the driver and passenger short sliding gates are folded with the floor pan into their respective positions. In FIG. 4D, the driver side tall gate assembly 403 and passenger side tall gate assembly 405 are shown folded over the driver side short gate assembly 409 and the passenger side short gate assembly 410 and is in its stowed extended position over the tailgate 401.

Figure 4E:
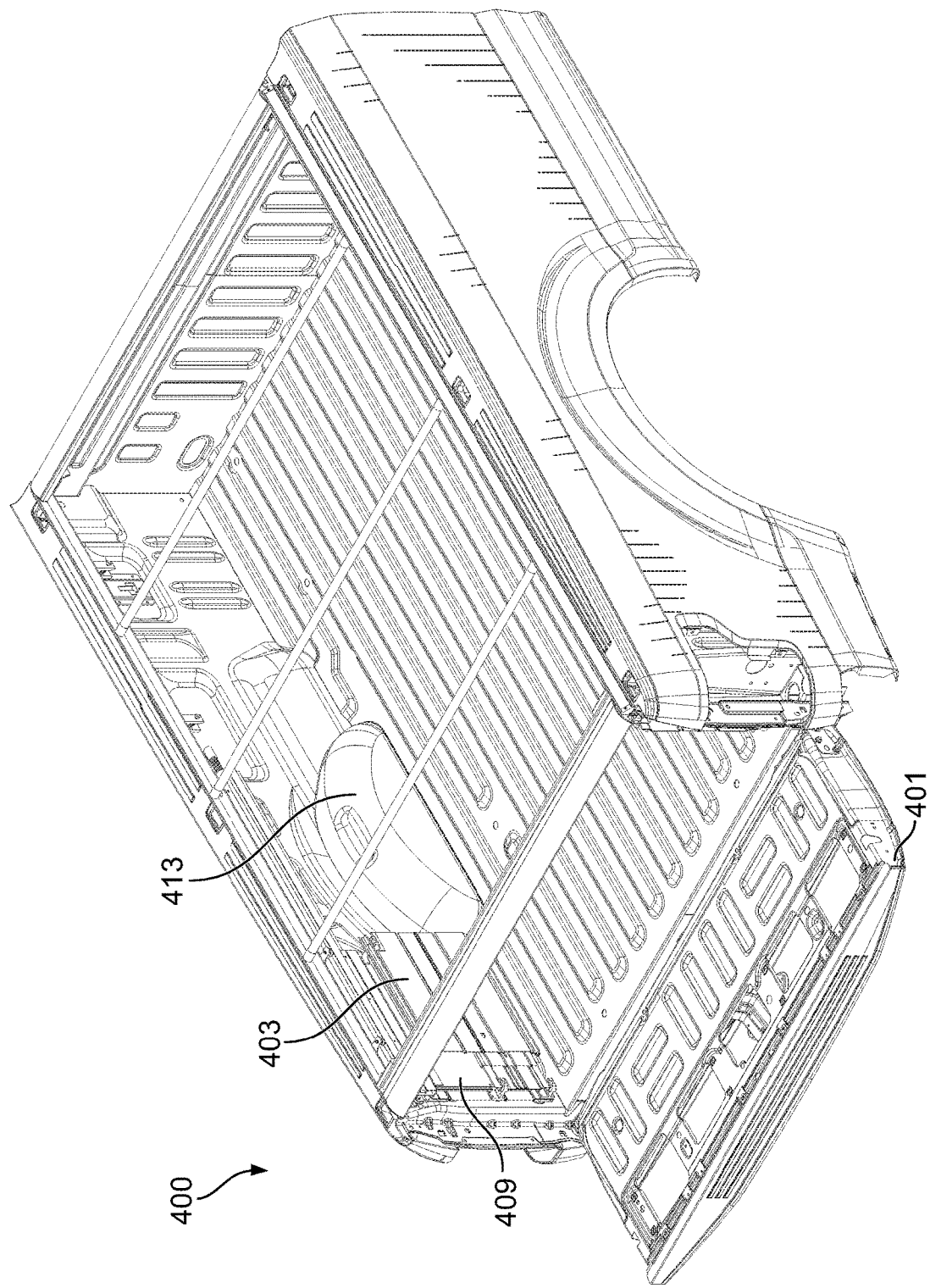
FIG. 4E is a perspective view of the cargo management basket illustrated in its forward stowed position against the sides of the truck bed.

FIG. 4E is a perspective view of the cargo management basket illustrated and folded against the sides of the truck bed. In this view, the folded panels forming the cargo management basket have been pushed forward from over the tailgate 401 to the sides of the truck bed just behind the wheel well 413. In this stowed position, the user has full access to the truck bed for cleaning or carrying large cargo.

Figure 5:
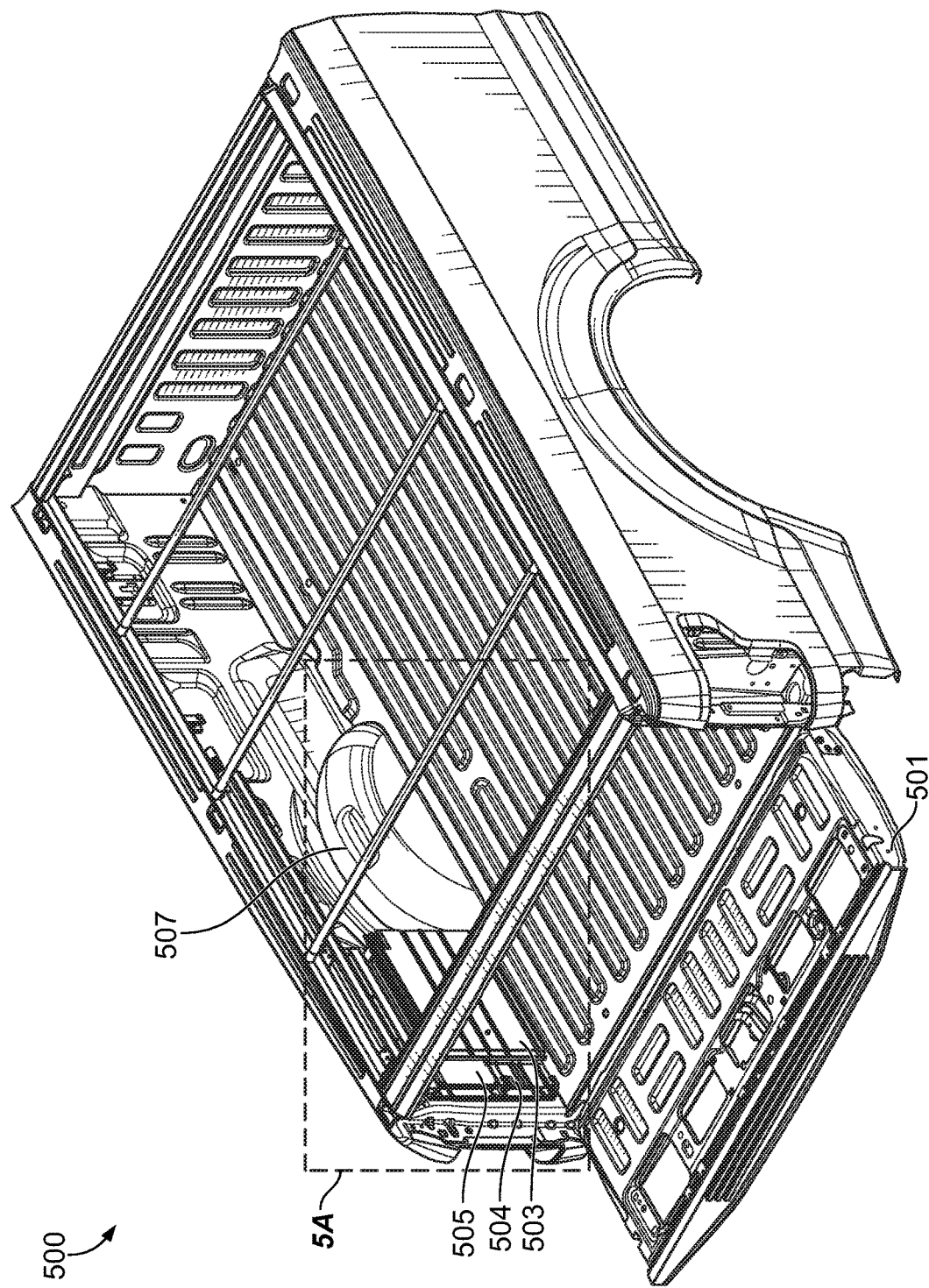
FIG. 5 is also a perspective view of the cargo management basket shown inside the truck bed in a stowed position.
Figure 5A:
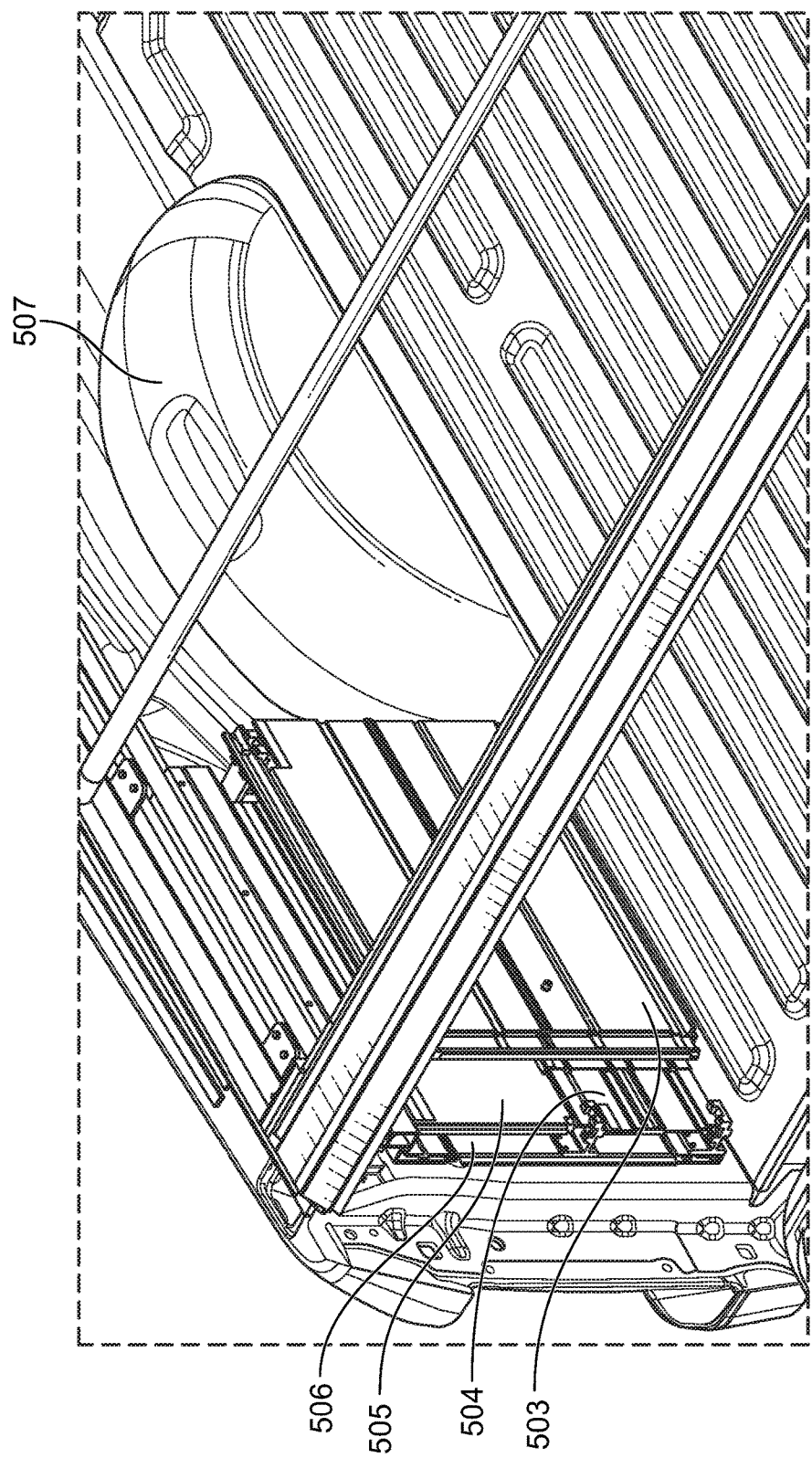
FIG. 5A is a magnified preservative view of the cargo management basket in a stowed position.

FIG. 5 is a perspective view of the cargo basket shown inside the truck bed in a fully stowed position. FIG. 5A is a magnified preservative view of the cargo basket in the stowed position. With regard to both FIG. 5 and FIG. 5A, the tonneau assembly 500 is shown mounted in the truck bed where the truck tailgate 501 in a down position. The driver side floor pan assembly 505 is folded against the driver side panel 506. The driver side short gate assembly 504 is folded upon the driver side floor pan assembly 505. The driver side tall gate assembly 503 is folded upon the driver side short gate assembly 504. When folded in this position, the cargo management basket is positioned on the side and substantially in parallel with the side of the truck bed just behind the wheel well 507 toward the truck tailgate. The folded position of the cargo management basket assembly allows the user full access to the truck bed.

Figure 6:
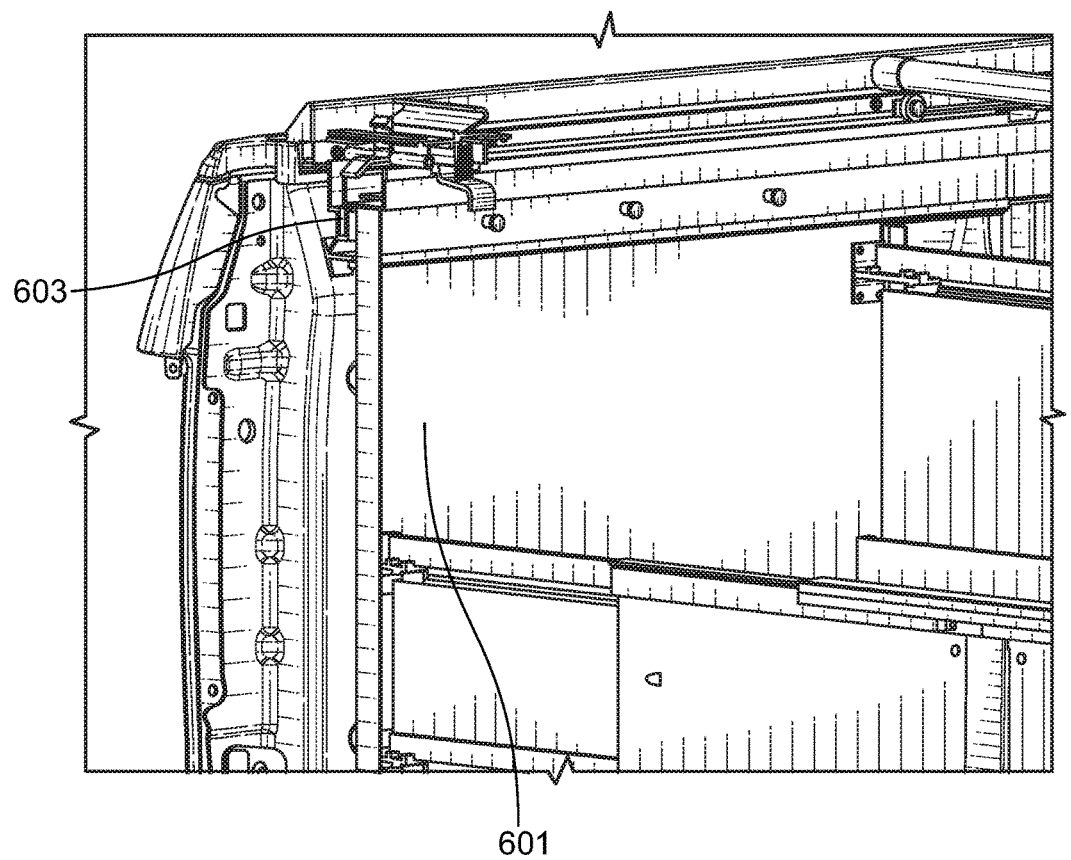
FIG. 6 is a magnified perspective view of the cargo management basket attached to a roller rail.

FIG. 6 is a magnified perspective view of the cargo management basket attached to a roller rail. The basket 601 is configured so to be attached to the roller rail 603 allowing the basket 601 to be moveable between a forward and extended position.

Figure 6A:
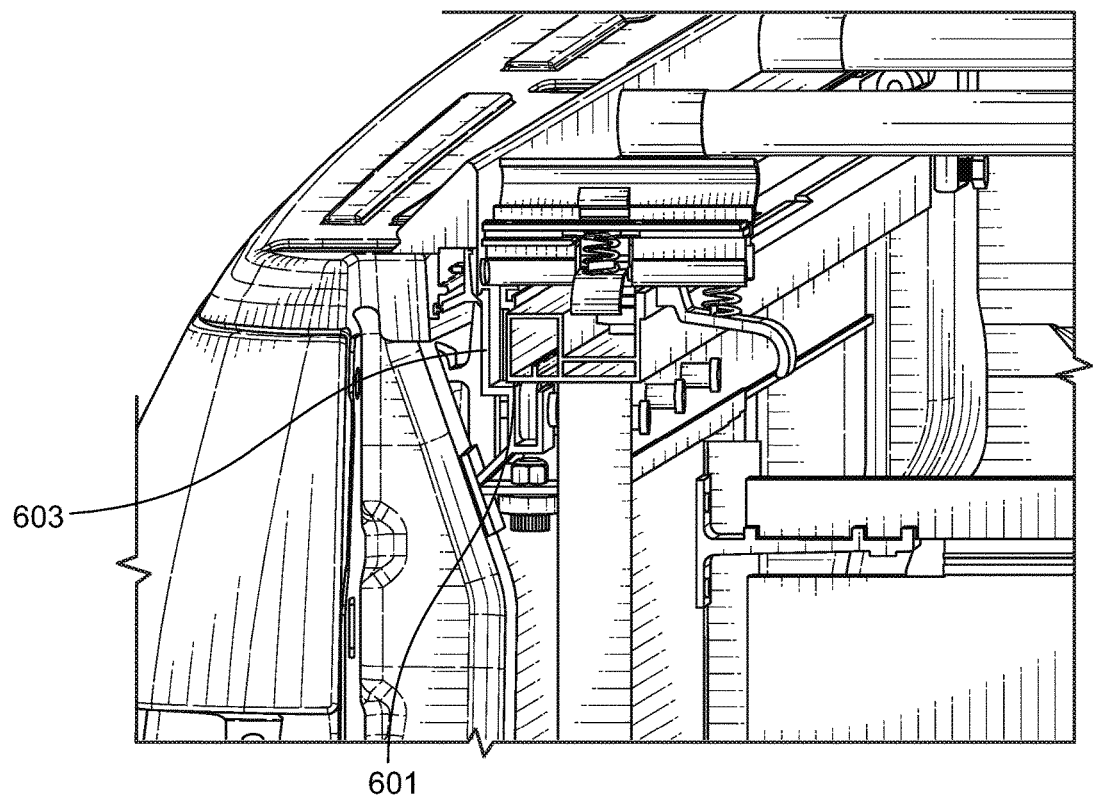
FIG. 6A is a cross-sectional view of the cargo management basket attached to a roller rail.

FIG. 6A is a cross-sectional view of the cargo management basket shown in FIG. 6 illustrating the basket attached to a roller rail.

Figure 7:
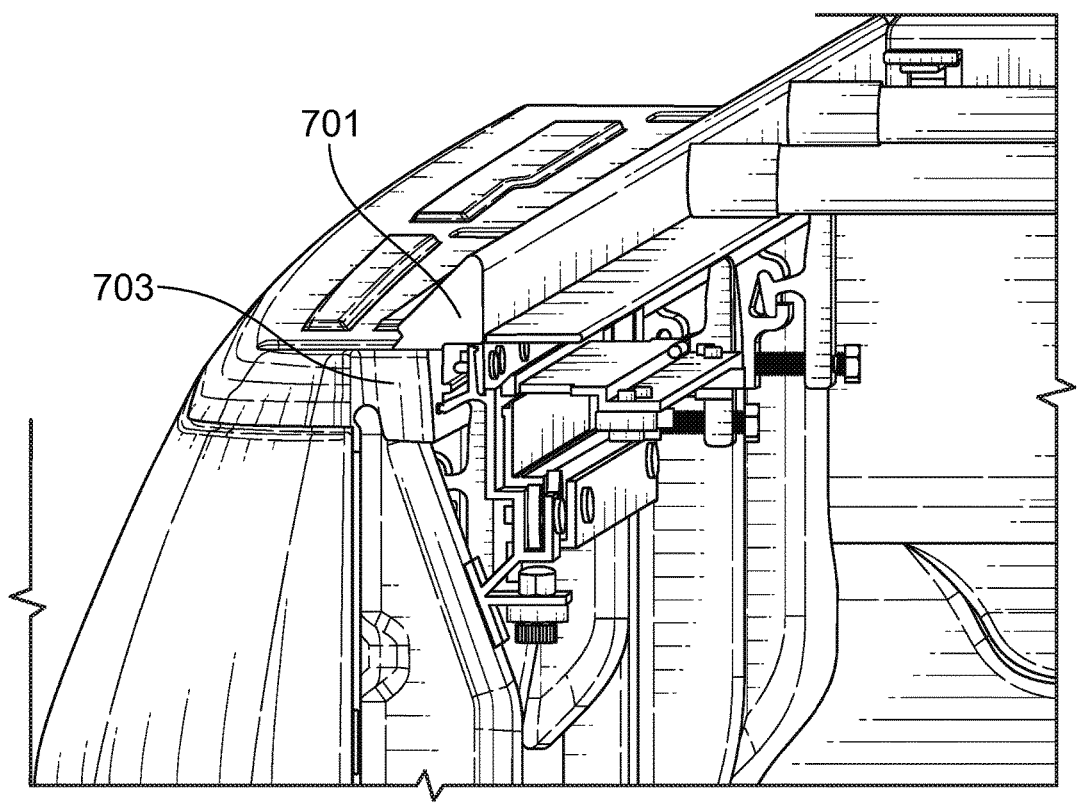
FIG. 7 is a magnified view illustrating the frame attached to the pick-up truck bed.

FIG. 7 is a magnified view illustrating the frame attached to the pick-up truck bed. The frame 701 is configured to be positioned on top of the truck bed 703.

Figure 7A:
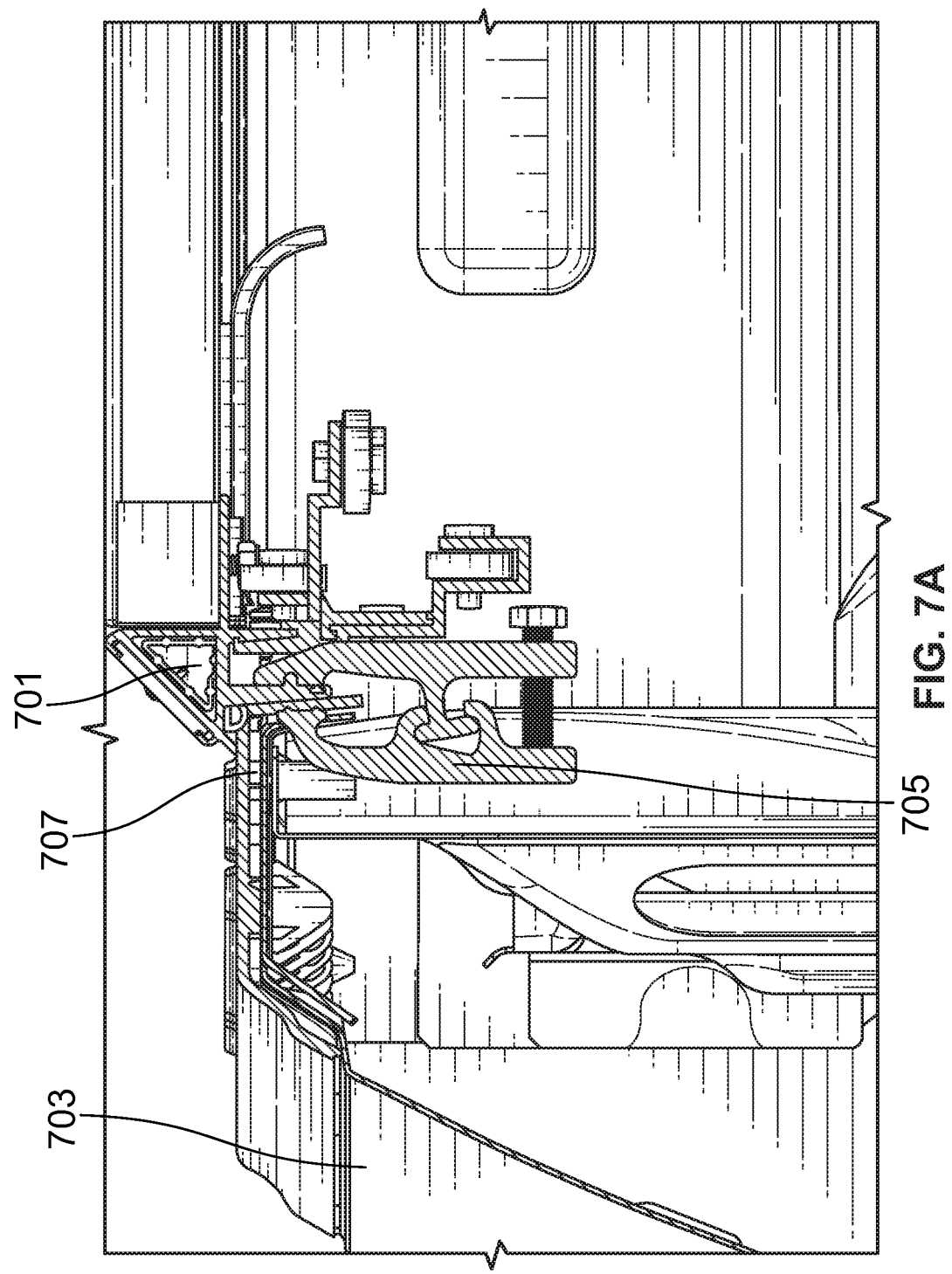
FIG. 7A is a cross-sectional view of the frame and pick-up truck bed illustrated in FIG. 7.

FIG. 7A is a cross-sectional view of the frame and pick-up truck bed illustrated in FIG. 7 where the frame 701 sits on top of the truck bed 703. Side rail clamp 705 engages under the rim 707 of the truck bed 703.

Thus, the tonneau with a cargo management basket provides high utility accessory adding a rear storage compartment or basket to a vehicle having a cargo bed. The tonneau provides easy access to the basket providing an additional means to safely transport everyday items without them moving freely about the bed. This adds safety and prevents damage to both the truck and/or goods. The tonneau requires no alternations on the vehicle and fastens with clamps to hold the tonneau top rails in place. The tonneau top rails hold the cover assembly in place along with supporting the entire storage compartment. Further, the tonneau includes a rear slide out storage compartment that is designed to operate inside of the truck bed while under a protective tonneau cover. Thus, while in use, the cargo basket can be accessed without having to open the tonneau cover. The cargo basket uses roller that moves in a track on a rail for ease of operation allowing access to the basket over the pickup tailgate area. The cargo basket moves and is suspended above the truck bed so that it does not touch the bed.

In an alternative embodiment, the cargo basket may also include a sling/storage bag or net replacing the bottom of the basket. The bag works to restrain smaller items without having to individually tie them down. The sling/storage bag is attached to the front and rear gates which creates a storage bag with cover and sides for protection of the items. The tonneau with cargo management also provides access to the entire length of the truck bed. Both the front and rear gates can be easily folded away and fastened outside of the truck wheel wells. This enables full use of the truck bed for larger items such a plywood, drywall, appliances etc.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A tonneau for use with a pick-up truck bed comprising:
a frame for attachment over the truck bed;
a cover configured on top of the frame to protect the contents of the bed; and
a slidable cargo management basket configured at the rear of the pick-up truck bed, such that the basket is moveable, between a forward and extended position, without removing any portion of the cover, where the basket is configured over the pick-up truck tailgate when in the extended position, for providing an easily accessible cargo area at the rear end of the bed while standing at ground level and preventing movement of cargo in the basket during vehicle motion in the forward position; and
wherein the cargo management basket slides on the frame using a rail assembly and is foldable into a stowed position for providing access under the frame into the truck bed.

2. A tonneau as in claim 1, wherein the cargo basket moves above a floor of the truck bed.

3. A tonneau as in claim 1, wherein the slidable cargo basket includes at least one slidable panel for accessing the truck bed.

4. A tonneau as in claim 1, wherein the frame is held to the truck bed using a plurality of clamps.

5. A tonneau as in claim 1, wherein the slidable cargo basket includes a floor pan that pivots to a folded stowed position.

6. A tonneau for providing a cover for a pick-up truck bed comprising:
a substantially rectangular frame secured under an upper rim of the pick-up truck bed;
a cover attached to the frame for protecting cargo in the pick-up truck bed;
a cargo management basket that slides between a forward and extended position without removing the cover such that when in an extended position the basket extends over a lowered pick-up truck tailgate for allowing cargo to in the basket to be accessible to the user while standing at the rear of the truck bed; and
wherein the cargo management basket includes a foldable floor pan.

7. A tonneau as in claim 6, wherein the moveable basket uses a plurality of slidable panels to conceal cargo in the basket.

8. A tonneau as in claim 6, wherein the frame is held to the truck bed using a plurality of clamps.

9. A tonneau as in claim 6, wherein the cargo basket slides using a roller assembly.

10. A tonneau as in claim 6, wherein the moveable cargo basket is foldable on at least one side of the truck bed.

11. A tonneau for covering a pick-up truck bed comprising:
a frame secured under an upper rim of the pickup truck bed;
a cover for covering the frame and the pickup truck bed;
a slideable basket and movable without removing any portion of the cover between a forward and extended position where the basket is formed using a plurality of foldable panels for stowing the basket to at least one side of the pickup truck bed and providing access to the interior thereof; and
wherein the slideable basket extends over a lowered pick-up truck gate when in the extended position for allowing user access to the slidable basket at the rear end of the pickup truck bed.

12. A tonneau as in claim 11, wherein the cargo basket moves using a roller assembly.

13. A tonneau as in claim 11, wherein the frame is held under a rim of the pick-up truck bed using at least one clamp.

14. A tonneau as in claim 11, wherein the basket is foldable to at least one side of the truck bed.

15. A tonneau as in claim 11, wherein the basket includes a sling bag for preventing movement of the cargo in the basket.

16. A tonneau for use with a pick-up truck bed comprising:
a frame for attachment over the truck bed;
a cover configured on top of the frame to protect the contents of the bed;
a cargo basket which slides on a rail assembly attached to the frame and moves between a forward and extended position for providing an easily accessible cargo area to prevent movement of cargo in the basket, where the cargo basket is foldable enabling at least one portion of the basket to be configured to a side of the truck bed for providing access to an interior of the truck bed; and wherein the cargo basket extends over a lowered pick-up truck gate when in the extended position for allowing user access to the cargo basket at the rear end of the pickup truck bed.

17. A tonneau as in claim 16, wherein the slidable cargo basket slides using a roller assembly without touching the truck bed.

18. A tonneau as in claim 16, wherein the slidable cargo basket includes at least one slidable gate for accessing the truck bed.

19. A tonneau as in claim 16, wherein the frame is held to the truck bed using a plurality of clamps.

20. A tonneau as in claim 16, wherein the slidable cargo basket includes a floor pan that pivots into a folded stowed position.

\* \* \* \* \*